United States Patent Office 3,792,161
Patented Feb. 12, 1974

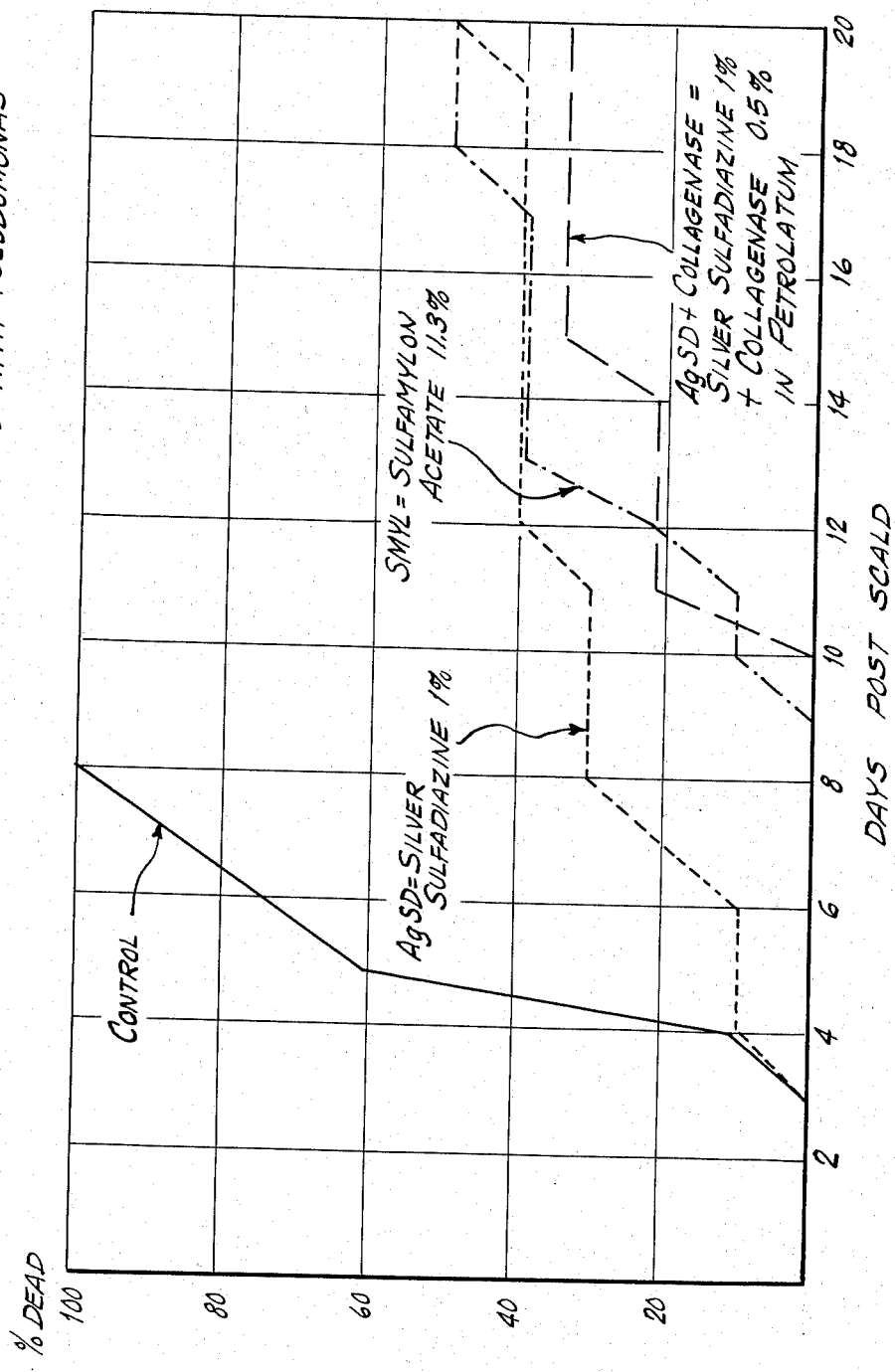

3,792,161
BURN OINTMENT COMPRISING SILVER
SULFADIAZINE AND COLLAGENASE
Charles L. Fox, Jr., New York, N.Y., assignor to
Research Corporation, New York, N.Y.
Continuation-in-part of application Ser. No. 38,031, May 18, 1970, now Patent No. 3,761,590, which is a continuation-in-part of abandoned application Ser. No. 653,830, July 17, 1967. This application Nov. 24, 1970, Ser. No. 92,361
The portion of the term of the patent subsequent to Sept. 25, 1990, has been disclaimed
Int. Cl. A61k 19/00, 27/00
U.S. Cl. 424—94                                    1 Claim

ABSTRACT OF THE DISCLOSURE

An ointment made of silver sulfadiazine and collagenase dispersed in a non-aqueous hydrophobic carrier, such as petrolatum, has been found to be useful in burn therapy. The silver sulfadiazine is present in the ointment in an effective antibacterial amount, such as an amount in the range from about 0.1 to about 10.0% by weight based on said ointment. The collagenase is present in the ointment usually in an amount in the range from about 0.01–0.05% to about 2.0% by weight based on said ointment. Petrolatum is preferred as the non-aqueous hydrophobic carrier. When applied in burn therapy the silver sulfadiazine component of the ointment is antibacterial, for example, is effective against *Pseudomonas aeruginosa*, and the collagenase component of the ointment appears to improve or accelerate the separation of the eschar and promotes healing.

---

This application is a continuation-in-part application of my copending patent application Ser. No. 38,031 filed May 18, 1970, now U.S. Pat. 3,761,590, issued Sept. 25, 1973 which in turn is a continuation-in-part of my patent application Ser. No. 653,830 filed July 17, 1967, now abandoned. The disclosures of the above-identified patent applications are herein incorporated and made part of this disclosure.

In my above-identified patent applications the efficacy of the topical application of silver sulfadiazine incorporated in a water-dispersible or hydrophilic ointment in burn therapy is disclosed, see also the publications C. L. Fox, Jr. "Silver Sulfadiazine—A New Topical Therapy for Pseudomonas in Burns." Arch. Surg. 96, 184–188, February 1968; Charles L. Fox, Jr., B. W. Rappole and W. Stanford entitled "Control of Pseudomonas Infections in Burns by Silver Sulfadiazine," Surg. Gyn. & Obst. 128, 1021–1026, May 1969; W. Stanford, B. W. Rappole and C. L. Fox, Jr. entitled "Clinical Experience with Silver Sulfadiazine a New Topical Agent for Control of Pseudmonas Infections in Burns," J. of Trauma, 9, 1969 and Charles L. Fox, Jr., Angus C. Sampath and John W. Stanford entitled "Virulence of Pseudomonas in Burned Rats and Mice, Arch." Surg., October 1970, vol. 101, pp. 508–512.

One of the problems in burn therapy is the difficulty of removing the eschar and necrotic tissue to permit wound closure by grafts. In the absence of topical antibacterial therapy bacterial proliferation usually produces proteolysis which aids in the separation of necrotic tissue. This, however, is often deleterious and may result in fatal invasive sepsis. The use, however, of effective topical antibacterial therapy may inhibit these bacterial activities and delay the separation of the eschar.

Collagenase has been reported as being useful in a topical treatment of burns, see W. E. Zimmerman "Topical Treatment of Burns with Collagenase Physiopathology and Treatment of Burns," Ed. J. Lorthioir, Presses Academiques Europeenes, Bruxelles 6, 413–429 (1969), the Journal of the American Medical Association, Apr. 27, 1970, vol. 212, No. 4, pp. 560–561, and see also the report of the first Interdisciplinary Symposium on Collaganase held at Columbia University, College of Physicians and Surgeons, Feb. 5, 1970, as published in Science, vol. 169, 1234–1238, Sept. 18, 1970, wherein it was reported that good therapeutic effects were obtained when patients were given topical applications of bacterial collagenase in an ointment base for debridement of second and third degree burns prior to skin grafting and for the treatment of dermal ulcers.

The disclosures of each of the above-identified publications are herein incorporated and made part of this disclosure.

Collagenases, by definition, are enzymes capable of digesting native, undenatured collagen under physiological conditions of pH and temperature. True collagenases at one time were believed to be vary rare and until recently *C. histolyticum* was thought to be the only non-mammalian source of this type of enzyme. Collagenases have been produced by culturing aerobic strains of Clostridium, e.g. *C. histolyticum* or *C. welchii*, see U.S. Pat. 3,201,325.

It is an object of this invention to provide compositions useful in burn therapy.

It is another object of this invention to provide an improved burn therapy or procedure to be followed in burn therapy.

How these and other objects of this invention are achieved will become apparent in the light of the accompanying disclosure, particularly with reference to the accompanying drawing which graphically illustrates the efficacy of compositions in accordance with this invention when employed in burn therapy. In at least one embodiment of the practices of this invention at least one of the foregoing objects will be achieved.

In accordance with this invention it has been discovered that a composition or ointment containing silver sulfadiazine and collagenase dispersed in a non-aqueous carrier, such as Vaseline, mineral oil, petrolatum or a petroleum jelly, is useful for topical application in the treatment of wounds, such as burns, infections, ulcers and the like. Compositions comprising a minor amount of silver sulfadiazine, such as an amount of silver sulfadiazine in the range from about 0.1% up to about 10% by weight, and collagenase, such as an amount in the range of 0.01 to about 2.0% by weight, dispersed in a non-aqueous hydrophobic carrier, the aforesaid percentages being based on the total composition, have been found to be effective in burn therapy.

In the preparation of compositions in accordance with this invention the silver sulfadiazine component is the antibacterial agent. Silver sulfadiazine evidences effective antibacterial activity in small amounts, such as an amout as low as about 0.01% by weight and less.

The other component, the collagenase, of the compositions in accordance with this invention evidences or exhibits collagenolytic activity and, when employed in burn therapy, aids in effecting the removal and clearing of necrotic tissue. Collagenase in compositions in accordance with the practices of this invention is employed in very minor, effective amounts, such as an amount in the range from about 0.001–0.15% up to about 2.0% by weight, more or less.

Desirably, the collagenase-containing compositions in accordance with the practices of this invention are incorporated in a non-aqueous carrier, particularly in a non-aqueous hydrophobic carrier, such as Vaseline, petrolatum or petroleum jelly and the like.

In order to demonstrate the efficacy of compositions in accordance with this invention in burn therapy, rats were subjected to standardized burns, the burned tissue then seeded with a virulent Pseudomonas strain and then therapy applied. To demonstrate the advantages of the practices of this invention topical therapy was performed utilizing both silver sulfadiazine and another antibacterial agent alone and silver sulfadiazine in combination with collagenase. Observations were made in terms of the overall mortality of the burned animals and also in terms of the time of removal of necrotic tissue and the interval required for the healing of the wound created by the thermal trauma. The tests and the test results observed are set forth hereinbelow:

MATERIALS AND METHODS

(1) Animals, thermal injury and bacterial seeding

Female Sprague-Dawley rats weighing 180–200 gm. were anesthetized by the intraperitoneal injection of pentobarbital (35 mg./kg. body weight). The method of scalding employed was essentially that described by Walker and Mason, see A Standard Animal Burn, SRU, BAMC, 23-i (1968). The fur on the dorsum and flanks of the rats was closely clipped (but not shaven) with an Oster small animal clipper. Scalds of 14–18% of body surface area were produced by immersion of the dorsum of each animal for exactly 10 seconds in water heated to 95° C.±0.5°. The studies of Foley, Greenerwald and Nash, see Relationship of Depth to Area in Experimental Scald Burns of Rats, SRU, BAMC, 24-ii (1968), showed that burns of 10, 20, 30% are all full thickness using this Walker model.

The animals were inoculated one hour post-burn with 1 ml. of 18-hour undiluted nutrient broth culture of Pseudomonas containing approximately $5 \times 10^8$ organisms per milliliter. The bacterial suspension was evenly applied over the burned surface by the use of a cotton tipped applicator. The full thickness nature of the injury was demonstrated in untreated control rats that survived; the wounds remained open for 1–2 weeks and gradually healed by contraction approximately 2 weeks later. Each experimental group consisted of animals selected at random 24 hours after burning and seeding. They were kept in individual cages in a controlled temperature room at 37° C. Animals that died during the initial 24-hour period were excluded from the mortality data.

(2) Topical therapy

All treatment was started 24 hours post-burn. Silver sulfadiazine in a water-dispersible, oil-in-water carrier was used as a 1% by weight ointment. Maphenide, as Sulfamylon, Winthrop Laboratories brand of maphenide, was used as the acetate in the amount 11.3% by weight in a water-dispersible cream. Collaganase was incorporated in the amount 0.5% by weight in petrolatum containing 1% by weight silver sulfadiazine. The animals were treated once daily by using gloved fingers and firmly pressing the test ointment into the burned tissue. Care was taken to get the ointment into all fissures and exposed sub-eschar tissue and, in this way, the surface was cleansed but any residual ointment was not removed prior to treatment.

(3) Cultures

In most of the rat experiments, heart blood cultures were made post mortem.

One of the later experiments was set up with duplicate groups so that ante mortem cultures could be made at intervals throughout the course of the experiment. Samples of lung, liver, kidney and sub-eschar tissue were removed, weighed, homogenized in broth and diluted for plate counts. Two animals from each experimental group were sacrificed at 4, 8, 12, 15 and 20 days post-burn, respectively. The untreated group survived only until the 12th day post-burn.

Pseudomonas strains cultured from hospital patients and believed to be virulent for rats were employed.

RESULTS

The control rats died usually about 7–14 days post-burn. In some instances, the mortality in the control animals was as low as 20%. All control animals developed open wounds on their back which healed slowly by contracture. Bacterial counts in the extensive necrosis of the sub-eschar tissue averaged $47 \times 10^5$ organisms per gram of sub-eschar tissue and $17 \times 10^5$ organisms per gram in the organs (liver, kidney, lung). Blood cultures were positive in the untreated group from day 4 to the day of death. The overall mortality in the group of 264 animals showed that the control mortality was 90.3% and the mortality with silver sulfadiazine and maphenide was 14.4% and 16.4%, respectively, see Table I. In smaller groups of animals treated with the combination collagenase and silver sulfadiazine, the mortality results were either the same as with silver sulfadiazine alone or slightly better with the combination.

More important, however, were the observations of the removal of the eschar and the wound healing as gauged by the covering of an epithelial-like surfacing. The animals treated with the collagenase-silver sulfadiazine combination lost the eschar and the necrotic tissue more rapidly. In addition, in a larger number of animals, the whitish epithelial-like covering of the burned wound developed, to a large degree after the collagenase-silver sulfadiazine therapy.

Wound healing was more rapid among the silver sulfadiazine treated animals than in those treated with maphenide. The separation of the eschar and beginning healing was observed to occur sooner in the animals treated with the combination collagenase-silver sulfadiazine. In addition, the covering with the "pseudo" epithelium was observed most frequently in the group treated with the combination collagenase-silver sulfadiazine.

Bacterial counts of tissue from representative groups of treated animals, not included in the mortality studies and sacrificed for the purpose of counting, show little colonization of sub-eschar region in comparison to the counts $0.8 \times 10^5$ colonies per gram tissue in the control untreated rats. Blood cultures were negative in the treated animals. Cultures of internal organs of these animals were likewise negative.

DISCUSSION

The silver sulfadiazine and maphenide treatments showed similar average mortality figures. The mortality figures with the combination collagenase-silver sulfadiazine were similar to those with silver sulfadiazine alone but slightly better. In these studies most deaths occurring after treatment with silver sulfadiazine were from groups of animals seeded with a particular strain of Pseudomonas (WH6D). Most of the deaths in the groups treated with maphenide (Sulfamylon Acetate) occurred with other strains that were completely controlled by silver sulfadiazine. The separation of the eschar occurred most rapidly with the combination collagenase-silver sulfadiazine and the number of animals showing healing by covering with an epithelial-like tissue was greatest in this combination therapy group. In addition, those rats which did not develop pseudo membrane covering exhibited clean wounds and eventual healing. It is significant that the combination collagenase-silver sulfadiazine did not, in any instance, lead to spreading of the infection nor the development of sepsis as judged by the absence of positive blood cultures and the low counts in the sub-eschar tissue of the few animals which succumbed.

It would appear, based on these tests, that the combination collagenase-silver sulfadiazine offers an advantage in removing the necrotic tissue and setting the stage for healing of the burn wound. No evidence of toxicity, either in terms of onset of infection, delay in healing or loss of weight was observed in the collagenase-silver sulfadiazine-treated animals. The presence of collagenase, e.g. 0.5% by weight, did not hamper nor interfere with the efficacy of the silver sulfadiazine and appeared to hasten and improve covering of the wound after full thickness scalds infected with rat-virulent Pseudomonas strains. No toxicity and no spread of the infection resulted from the use of the collagenase in combination with silver sulfadiazine.

Tests were also carried out on Pseudomonas challenged scalded animals involving topical application of petrolatum alone and collagenase in petrolatum. The results of these tests indicated that petrolatum alone and collagenase in petrolatum performed about the same but not better than when the Pesudomonas challenged scalded animals received no treatment.

TABLE I

Comparison of silver sulfadiazine, maphenide (sulfamylon acetate) and collagenase-silver sulfadiazine ointment in burned rats seeded with strains of pseudomonas

| Experiment Number | Pseudomonas strain | Mortality in 21 days of— | | | |
|---|---|---|---|---|---|
| | | NO R | Silver sulfadiazine | Maphenide | Silver sulfadiazine collagenase |
| 1 | 2208 | 4–4 | 0–4 | 0–4 | |
| 2 | 2208 | 4–5 | 0–5 | 2–5 | |
| 3 | 314 | 5–10 | 0–10 | 2–10 | |
| 5 [1] | WH6D | 0–4 | 1–5 | 0–5 | |
| 6 | WH6D | 9–9 | 3–8 | 2–10 | |
| 7 | WH6D | 9–10 | 1–10 | 0–10 | |
| 8 | WH6D | 7–7 | 3–8 | 0–8 | |
| 9 | WH6D | 10–10 | 0–10 | 0–10 | |
| 11 | WH6D | 10–10 | 1–10 | | |
| 4C [1] | 1896 | 2–10 | 0–10 | 0–10 | 0–10 |
| 10C | WH6D | 8–8 | 5–10 | 5–10 | 3–9 |
| 12C | WH6D | 9–10 | 0–15 | | 0–15 |

[1] See the following table:

| | Mortality in 21 days of— | | | |
|---|---|---|---|---|
| | NO R | Silver sulfadiazine | Maphenide | Silver sulfadiazine collagenase |
| Totals omitting #4C and 5 with low mortality in controls | 75/83 | 13/90 | 11/67 | 3/24 |
| Mortality percent | 90.3 | 14.4 | 16.4 | 12.5 |
| Results with WH6D | 35/36 | 7/36 | 2/38 | 3/24 |
| Results with other strains | 13/19 | 0/19 | 4/19 | 0/10 |

In accordance with yet another embodiment of the practice of this invention directed to a regime for burn therapy, it would appear that an effective regime to be employed in burn therapy involves topical treatment of the burn wound with silver sulfadiazine dispersed in a water-dispersible or water-soluble carrier of the type disclosed in copending patent application Ser. No. 38,031, e.g. Neobase ointment, followed by, after substantial stabilization of the patient, a topical burn therapy employing compositions in accordance with the practices of this invention, i.e. a composition comprising silver sulfadiazine and collagenase dispersed in a non-aqueous carrier, such as a hydrophobic carrier, e.g. Vaseline, petrolatum, mineral oil and the like. In this two stage regime for burn therapy, the first stage of the burn therapy involves treatment of the wound by topical application of silver sulfadiazine dispersed in a water-dispersible or water-soluble carrier. This treatment is carried out for an extended period of time of about 1–2 weeks, more or less, to achieve stabilization of the patient's condition. Following stabilization of the patient's condition, the first stage treatment may be discontinued and the second stage treatment commenced, i.e. treatment of the burn patient by topical application of a composition in accordance with this invention consisting essentially of silver sulfadiazine and collagenase dispersed in a non-aqueous carrier, such as a non-aqueous, hydrophobic carrier, e.g. Vaseline, petroleum jelly, petrolatum and the like. If desired, the compositions in accordance with this invention may be incorporated on a suitable substrate, such as a gauze bandage, a tape containing the principal components silver sulfadiazine, collagenase and a non-aqueous carrier.

Various techniques and devices may be employed for the utilization of or topical application of silver sulfadiazine-collagenase-compositions in accordance with the practices of this invention, e.g. aerosol sprays containing silver sulfadiazine and collagenase, non-aqueous carriers admixed with silver sulfadiazine and collagenase and capable of forming a protective film, such as a gel-like film, on the applied surface.

As indicated hereinabove the compositions in accordance with this invention are prepared containing a minor amount by weight silver sulfadiazine and a minor amount by weight collagenase. For example, compositions useful in accordance with the practices of this invention may contain an amount of silver sulfadiazine in the range from about 0.01–0.1% by weight upwards of about 10% by weight, more or less, such as an amount of silver sulfadiazine of about 0.5–7.5% by weight, e.g. 1.0%, 2.0%, 3.0% and 5.0%. The collagenase component of the compositions in accordance with this invention is employed in an effective minor amount in the range from 0.001–0.01% by weight upwards of about 2–2.5%, more or less, such as an amount of about 0.2, 0.3, 0.5, 0.75 and 1.0.

As will be apparent to those skilled in the art in the light of the accompanying disclosure, many alterations, substitutions and modifications are possible in the practice of the invention without departing from the spirit or scope thereof.

I claim:

1. A method of treating burns in animal and man which comprises applying to the burned surface a therapeutically effective amount of a non-aqueous hydrophobic ointment composition consisting essentially of petrolatum, silver sulfadiazine and collagenase, said silver sulfadiazine being present in said composition in an amount in the range from about 0.1 to about 10.0% by weight and said collagenase being present in said composition in an amount in the range from about 0.01 to about 2.0% by weight.

References Cited

UNITED STATES PATENTS

| 2,422,688 | 6/1947 | Lott | 260—239.75 X |
| 3,092,552 | 6/1963 | Romans | 424—132 X |
| 3,267,006 | 8/1966 | Hakim et al. | 424—94 X |

OTHER REFERENCES

Chemical Abstracts: 59:5624f (1963).
Chemical Abstracts: 63:10513d (1965).
Remington: Pharmaceutical Sciences, 13th ed., 1965, p. 1421.
Chemical Abstracts: 53:15312b (1959).

ALBERT T. MEYERS, Primary Examiner

L. SCHENKMAN, Assistant Examiner

U.S. Cl. X.R.

424—228, Dig. 13